United States Patent [19]
Farr, Jr.

[11] 3,829,837
[45] Aug. 13, 1974

[54] CONTROLLER FOR ROTATIONAL STORAGE DEVICE HAVING LINKED INFORMATION ORGANIZATION

[75] Inventor: William W. Farr, Jr., Holliston, Mass.

[73] Assignee: Honeywell Information Systems Inc., Waltham, Mass.

[22] Filed: June 24, 1971

[21] Appl. No.: 156,259

[52] U.S. Cl.. 340/172.5, 340/174.1 G, 340/174.1 H
[51] Int. Cl. .............................................. G06f 7/22
[58] Field of Search.... 340/172.5, 174.1 G, 174.1 H

[56] References Cited

UNITED STATES PATENTS

| | | | |
|---|---|---|---|
| 3,412,382 | 11/1968 | Couleur et al. | 340/172.5 |
| 3,521,240 | 7/1970 | Bahrs et al. | 340/172.5 |
| 3,533,075 | 10/1970 | Johnson et al. | 340/172.5 |
| 3,546,677 | 12/1970 | Barton et al. | 340/172.5 |
| 3,548,384 | 12/1970 | Barton et al. | 340/172.5 |
| 3,614,746 | 10/1971 | Klinkhamer | 340/172.5 |
| 3,643,225 | 2/1972 | Rice et al. | 340/172.5 |
| 3,643,227 | 2/1972 | Smith et al. | 340/172.5 |
| 3,647,348 | 3/1972 | Smith et al. | 340/172.5 X |
| 3,647,979 | 3/1972 | Rubin | 340/172.5 X |
| 3,686,641 | 8/1972 | Logan et al. | 340/172.5 |
| 3,725,869 | 4/1973 | Sokoloff | 340/172.5 |
| 3,728,682 | 4/1973 | Helbig, Sr. | 340/172.5 |
| 3,729,712 | 4/1973 | Glassman | 340/172.5 |

OTHER PUBLICATIONS

Knuth, Donald E., Fundamental Algorithms–The Art of Computer Programming–Vol. 1, pp. 235–237, 278, 279.

*Primary Examiner*—Raulfe B. Zache
*Assistant Examiner*—Melvin B. Chapnick
*Attorney, Agent, or Firm*—John S. Solakian; Ronald T. Reiling

[57] ABSTRACT

A rotational storage device such as a drum or disk includes a plurality of circumferential tracks on the surface thereof. Each track includes a plurality of segments or pages, and each page includes data, a reverse pointer and a forward pointer stored therein. A record is comprised of one or more pages which are linked together by the forward and reverse pointers. The first page of the record links to the last and second pages and so on until the last page of the record links to the next to last and first page of the record. Controller apparatus is shown for reading, writing and editing using the reverse and forward pointers.

36 Claims, 12 Drawing Figures

PATENTED AUG 13 1974 3,829,837

SHEET 1 OF 8

INVENTOR
WILLIAM W. FARR, JR.
BY John S. Solakian
ATTORNEY

| DEVICE ADDRESS | POINTER FIELD | | PAGE NUMBER IN THE RECORD |
|---|---|---|---|
| | REVERSE | FORWARD | |
| A-0 | | | |
| A-1 | B-7 | C-2 | FIRST |
| A-2 | | | |
| A-3 | | | |
| A-4 | | | |
| A-5 | | | |
| A-6 | | | |
| A-7 | C-4 | B-7 | FOURTH |
| B-0 | | | |
| B-1 | | | |
| B-2 | | | |
| B-3 | | | |
| B-4 | | | |
| B-5 | | | |
| B-6 | | | |
| B-7 | A-7 | A-1 | FIFTH |
| C-0 | | | |
| C-1 | | | |
| C-2 | A-1 | C-4 | SECOND |
| C-3 | | | |
| C-4 | C-2 | A-7 | THIRD |
| C-5 | | | |
| C-6 | | | |
| C-7 | | | |

*Fig. 3.*

INVENTOR
WILLIAM W. FARR, JR.
BY John S. Solakian
ATTORNEY

INVENTOR
WILLIAM W. FARR, JR.
BY John S. Solakian
ATTORNEY

INVENTOR
WILLIAM W. FARR, JR.
BY John S. Solakian
ATTORNEY

PATENTED AUG 13 1974

3,829,837

INVENTOR
WILLIAM W. FARR, JR.
BY John S. Solakian
ATTORNEY

INVENTOR
WILLIAM W. FARR, JR.
BY John S. Solakian
ATTORNEY

INVENTOR
WILLIAM W. FARR, JR.
BY John S. Solakian
ATTORNEY

INVENTOR
WILLIAM W. FARR, JR.
BY John S. Solakian
ATTORNEY

CONTROLLER FOR ROTATIONAL STORAGE DEVICE HAVING LINKED INFORMATION ORGANIZATION

BACKGROUND OF THE INVENTION

1. Field of the Invention

This invention relates to rotational storage devices such as drums or disks and more particularly relates to the organization of information therein as well as controller apparatus for the reading, writing and editing of information therein.

2. Description of the Prior Art

In a modern data processing system, the need for large data bases and lengthy programs often necessitate information swapping, by which information currently in primary storage is exchanged or swapped with newly required information in back-up or secondary storage. Fast primary memory is a limited resource in today's data processing system. Only a few of the most current tasks may reside in primary memory, and all other information must be stored in less expensive, higher capacity, secondary storage. During swapping, programs or data are transferred from primary to secondary storage to make room for the newly requred information, which is then transferred to primary storage. The swap is commonly performed by a processor resident program and is usually made invisible to the user. The primary and secondary storage then becomes what is termed a "virtual memory."

Two important parameters of a virtual memory system are the time it takes to access information in secondary storage and the programming overhead required to accomplish the swap. Additional criteria that determine the suitability of the secondary storage media in this application are its storage capacity, reliability and cost per bit.

The secondary storage may be tape, drum or disk. However, in most high speed applications requiring virtual memory, a head-per-track disk (fixed head disk) is chosen as the secondary storage media because of its high reliability, low access time, and high data rate. Following the choice of a particular device, the format in which data are recorded on the disk or drum must be determined. The choice of the data format may affect the choice of the device. The factors involved in the choice of a format are:

1. The data block size
2. The record addressing scheme
3. The allowance for dead time between blocks for head switching
4. The read and write allocation and recovery schemes to be implemented by the system.

The choice of the data format and the data allocation schemes are particularly important because they affect subsequent decisions.

One prior art technique used in allocating disk space is to regard the disk as a serial-access device, and to write data into sequential locations. Thus, a starting address and data range are specified in order to initiate a transfer to the disk. Disk locations are then written sequentially until the range runs out. This technique works well until the disk is substantially recorded. Then, an obsolete record must be removed, or overwritten whenever a new record is to be stored. Because records often vary in length, a new record cannot always be stored where another once resided. More contiguous recording space must then be created until there is sufficient space to store the new record. For available spaces on the disk to be usable, the records between them must be moved until the spaces adjoin. Freeing the required core space and performing the disk transfers imposes a heavy time and software overhead on the system.

Another prior art technique utilized to allocate space on the disk is to divide each record into discrete equal-length parts called "pages," which can then be scattered over the disk. Unfortunately this method causes another problem. The record is no longer contiguous on the disk, and the location of each page must now be stored. If this last-mentioned information is kept in core, valuable primary storage space is used, and consequently, more information must be stored in primary storage of the system. On the other hand, some fixed location of the disk could be allocated to hold the page location information. If this is done, the effective access time is approximately twice the time needed to access the data alone since the page location information on the disk must be retrieved first.

It is therefore an object of this invention to provide a rotational storage device having an improved information organization and improved reading, writing and editing capabilities by alleviating the aforementioned problems associated with the prior art.

SUMMARY OF THE INVENTION

The purposes and objects of the invention are satisfied by providing a rotational storage device such as a drum or disk which includes a plurality of circumferential tracks on the surface thereof. Each track includes a plurality of segments or pages, and each page includes data, a reverse pointer and a forward pointer stored therein. A record is comprises of one or more pages which are linked together by the forward and reverse pointers. The first page of the record links to the last and second pages and so on until the last page of the record links to the next to last and first page of the record. Controller apparatus is shown for reading, writing an editing using the reverse and forward pointers.

BRIEF DESCRIPTION OF THE DRAWINGS

The advantages of the foregoing configurations of the present invention become more apparent upon reading the accompanying detailed description in conjunction with the figures in which:

FIG. 3 illustrates a pointer table indicating the topology of reverse and forward pointers in an exemplary record;

DETAILED DESCRIPTION OF THE PREFERRED EMBODIMENTS

Figure 1:
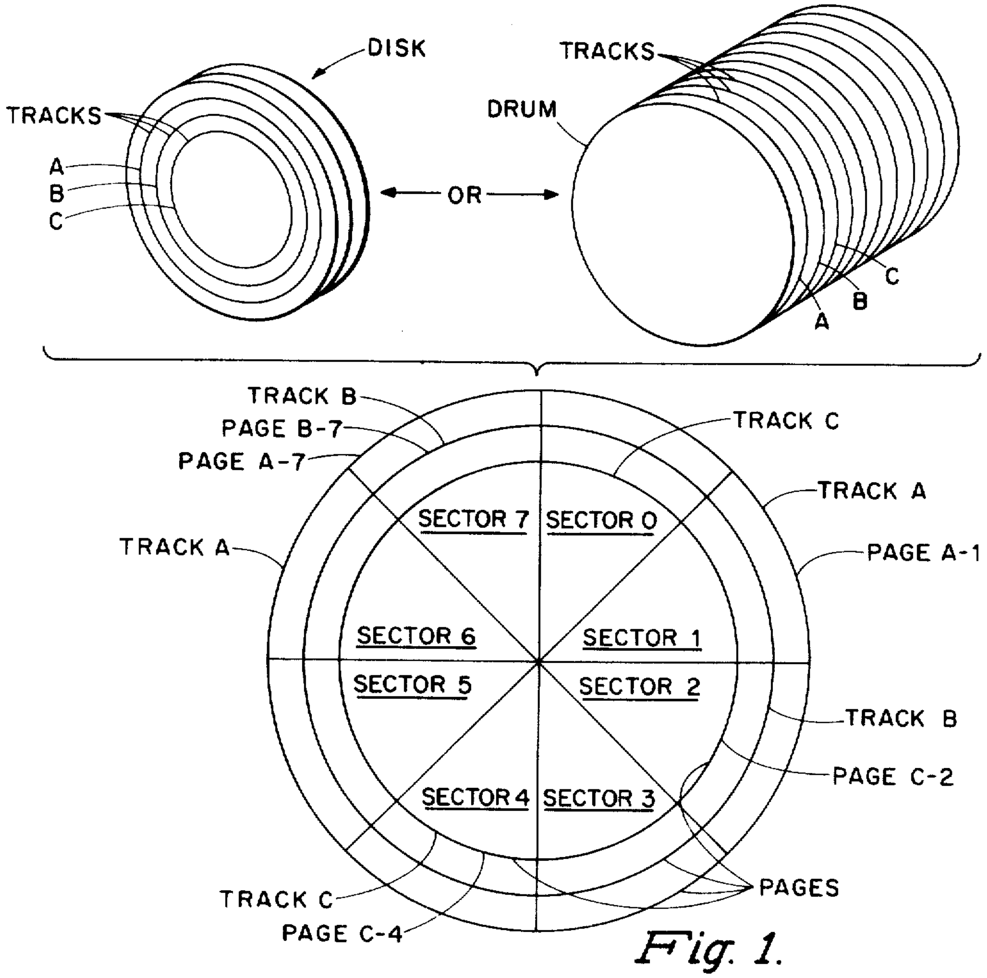
FIG. 1 illustrates a preferred organization of information on the rotational storage device.

FIG. 1 illustrates the basic information organization of the rotational storage device of the present invention. The rotational storage device may be either a disk or a drum and will be hereinafter referred to as a "device." A disk may include several disk surfaces on which concentric information storage tracks such as tracks A, B and C may be placed. The drum may include several circumferential tracks such as tracks A, B, and C placed side by side on the surface of the drum. Either device may utilize the information organization shown in the lower part of FIG. 1. Although shown as concentric tracks, the tracks may be side by side as on a drum. A plurality of tracks shown by way of example as tracks A, B, and C, are divided into a plurality of sectors, in this case eight sectors numbered sectors 0 through 7. That portion of either track within a sector is termed a "page" or "segment." Thus, with three tracks and eight sectors there are 24 possible pages. A particular page is addressed by supplying the sector and track number. If there is more than one device in the system, the device number must also be specified. For purposes of explanation the pages are referred to by the track and sector number. Thus, the page appearing in track A, sector 0, is identified as page A-0.

Figure 2A:
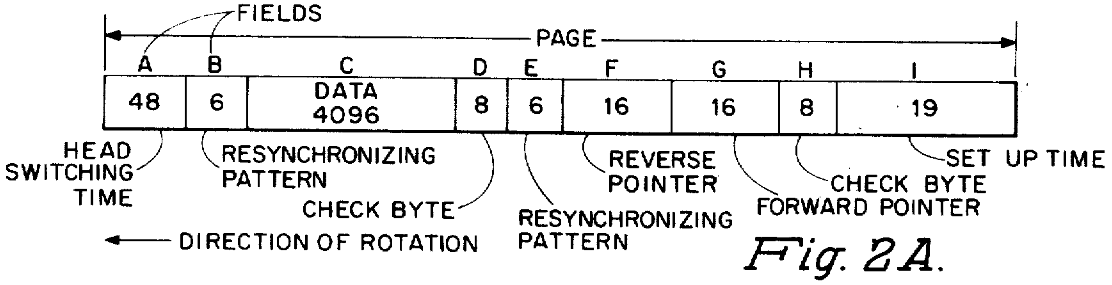
FIGS. 2A, 2B and 2C illustrate various formats for a page of information stored on the rotational storage device.

FIG. 2A illustrates one possible organization or format for each page. The blocks in the format designate fields of a page and the numbers in the blocks for each field indicate by way of example the number of bits in the particular field. Field A is utilized for head switching time and may be a partially recorded area which is long enough to permit head switching and read amplifier stabilization between sectors when changing the selected head to access data recorded on any other track in the device. Field B is a resynchronizing pattern and includes a specific bit pattern which allows the read logic in the device controller to resynchronize itself with the data recorded in field C. Field C is the data field itself. Field D is a check byte which is appended to the data during a write data order and is read by the device controller during a read data order. This check byte may be the logical exclusive or of all the bytes written in data field C. Field D is a specific bit pattern which allows the read logic in the controller to resynchronize itself with the pointers recorded in fields F and G. Field F contains the page address (track and sector) of the page which logically precedes the current page and is designated hereafter as the "reverse pointer." Field G contains the page address of the page which logically follows the current page and is designated hereafter as the "forward pointer." Field H is a check byte of fields F and G and is similar to the check byte in field D. Field I is the space allocated to allow time to set up the next device action by the program. Head switch time allocation, check byte systems and set up time allocation techniques are well known in the present state of the art. The present invention concerns itself with the fields C, F and G, that is, the data field the reverse pointer and the forward pointer are the basis of the discussion hereinafter. Note that for purposes of illustration the format of a page shows the forward and reverse pointer to follow the data field. It should be understood that the pointers may have preceded the data field or may have been shown on opposite sides of the data field without departing from the scope of the present invention.

Figure 2B:
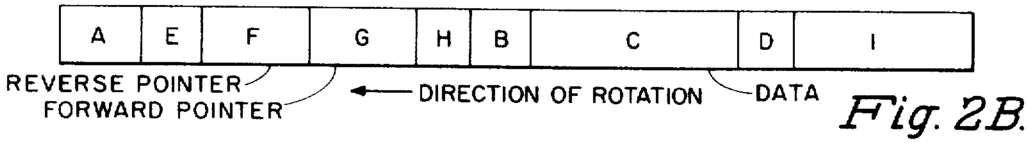
Figure 2C:
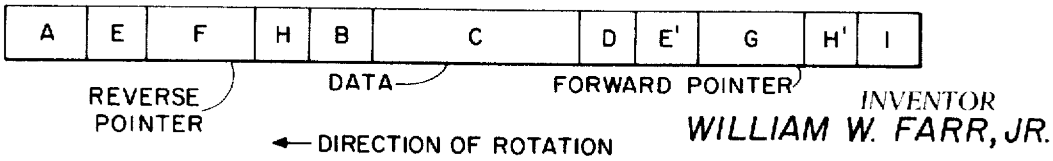

For example, FIG. 2B illustrates a page organization which includes fields F and G for the reverse and forward pointers respectively ahead of the data field C. FIG. 2C illustrates a page organization wherein a reverse pointer field F preceeds the data field C and wherein the forward pointer field G succeeds data field C. The organization of the page shown in FIG. 2C has at least one additional field of information over and above the page organizations shown in FIGS. 2A and 2B, they are an additional synchronizing pattern such as field E′ and possibly an additional check byte pattern shown as field H′. The apparatus of the present invention will be discussed primarily with regard to the format shown in FIG. 2A.

As discussed hereinbefore each track includes a plurality of pages. A record is defined to include a plurality of logically related pages. Each page in a record is linked to the previous and following page by the reverse pointer and forward pointer respectively. The first page includes a reverse pointer to the last page and a forward pointer to the second page and so on until the last page includes a reverse pointer to the next to the last page and a forward pointer to the first page.

FIG. 3 illustrates the topology of pointers in a five page record. The first page A-1 includes a reverse pointer addressing page B-7 (the fifth page) and a forward pointer addressing page C-2 (the second page). The second through fifth pages are similarly linked. It will be seen that one advantage of this page organization is that to read the record, only the starting page address, in this case page A-1, and depending upon the implementation the range (five) need to be specified to the device controller. The controller than transfers data to primary memory starting with the first word of the first page and continues transferring until the last word of the last page is in primary memory. Also, during an editing operation, only the pointers need updating when a page is inserted or deleted so that the data of an existing page need not be transferred.

Now referring to FIGS. 4, 5, 6, 7 and 8, apparatus illustrating the reading, writing and editing techniques utilized with the information organization shown in FIGS. 1 through 3 will be discussed. The apparatus of FIG. 4 includes a processor 20 and a memory 22 coupled together by a memory-processor transfer bus 24 which coupling is made by well known techniques. Processor 20 may receive data from data source 26 and is set in the read or write mode by the respective external inputs or under program control. Processor 20 also includes a memory address input, data input and data output as well as other hand shaking terminals to be discussed. Memory 22 may include a page buffer 21 and a data buffer 23. The data buffer 23 may include storage space for each page of data which may be received from data source 26 or rotational storage device 28. The page buffer includes the page address for each of the pages of a record beginning with the reverse pointer of the first page and ending with the forward pointer of the last page. The page buffer 21 in its simplest form may include a single address to the first page of the record. During a write operation, the page buffer includes addresses of each page of the record which is to be written. During a read operation, the page buffer need only include the address of one page in the record to be read. The page address in the page buffer may be the address of any page in the record, not necessarily the first page. During an edit operation, only part of the page addresses of a full record need be in the page buffer, namely the pages preceding and succeeding the page and the page address of the page to be added or deleted.

The rotational storage device 28 includes outputs indicating the present page number, a read output from which information is transmitted and a data strobe which emits a pulse for each bit position on the device as the device rotates. A read data command input as well as a write information input is also included in the device 28.

The processor 20 and the device 28 are coupled by means of gates, registers and counters well known in the art. Although single lines are shown interconnecting the various elements in FIG. 4, the number of actual lines is dependent on the length of the words stored in memory 22. Also, the number of gates, although shown as a single gate, is dependent on the length of the words received at the gate's input.

Note that AND gates are shown by symbols having a dot therein and that OR gates are shown in either a "wired or" manner or by symbols having a cross therein. Also it should be understood that various delay and timing means may be inserted in order to avoid any "race" condition.

The page buffer address counter 30 is coupled to receive the address of the page buffer 21 in memory 22 and is incremented after each transfer of the address information in page buffer 21. The data range counter 32 is coupled to receive data range information from processor 20 and is used to control the number of transfers during an operation. Data buffer address counter 34 is coupled to receive the address of the data buffer 23 in memory 22 and is incremented after each page transfer. The reverse pointer register 36 is coupled to receive the reverse pointer information from processor 20 during the write operation and from the device 28 during the read operation. Forward pointer register 38 is coupled to receive the forward pointer information from the processor 20 during the write operation and from the device 28 during the read operation. Present pointer register 40 is coupled to store the address of the page currently being processed. Register 40 is initially loaded with the present pointer information via processor 20 and is subsequently loaded usually but depending upon the operation with the present pointer information via forward pointer register 38. Buffer 42 is coupled to receive data from processor 20 or from device 28 during the write and read operations respectively and is a temporary storage device providing buffering for data transfer between the processor 20 and the device 28. Buffer 44 is a parallel input to serial output device commonly known in the art. Data received via buffer 42 is shifted out in response to shift or data strobe pulses and sent to the write input device 28. Buffer 44 is utilized during the write operation. Buffer 46 is utilized during the read operation and is a serial input to parallel output device. Data is shifted out of buffer 46 into buffer 42 and then into the data input of processor 20.

Figure 4:
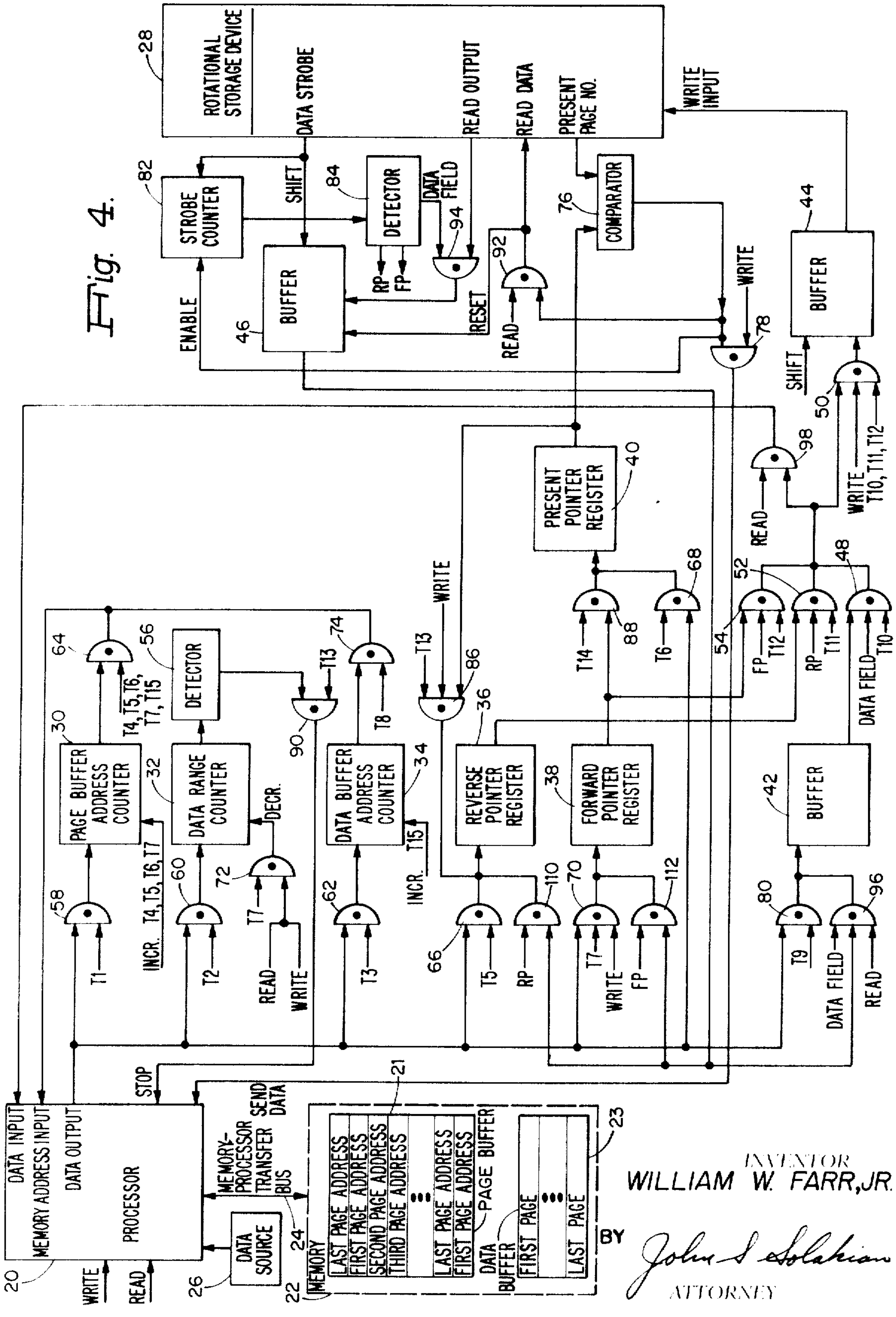
FIG. 4 is a schematic block diagram illustrating the read and write control circuitry utilized in the present invention.
Figure 5:
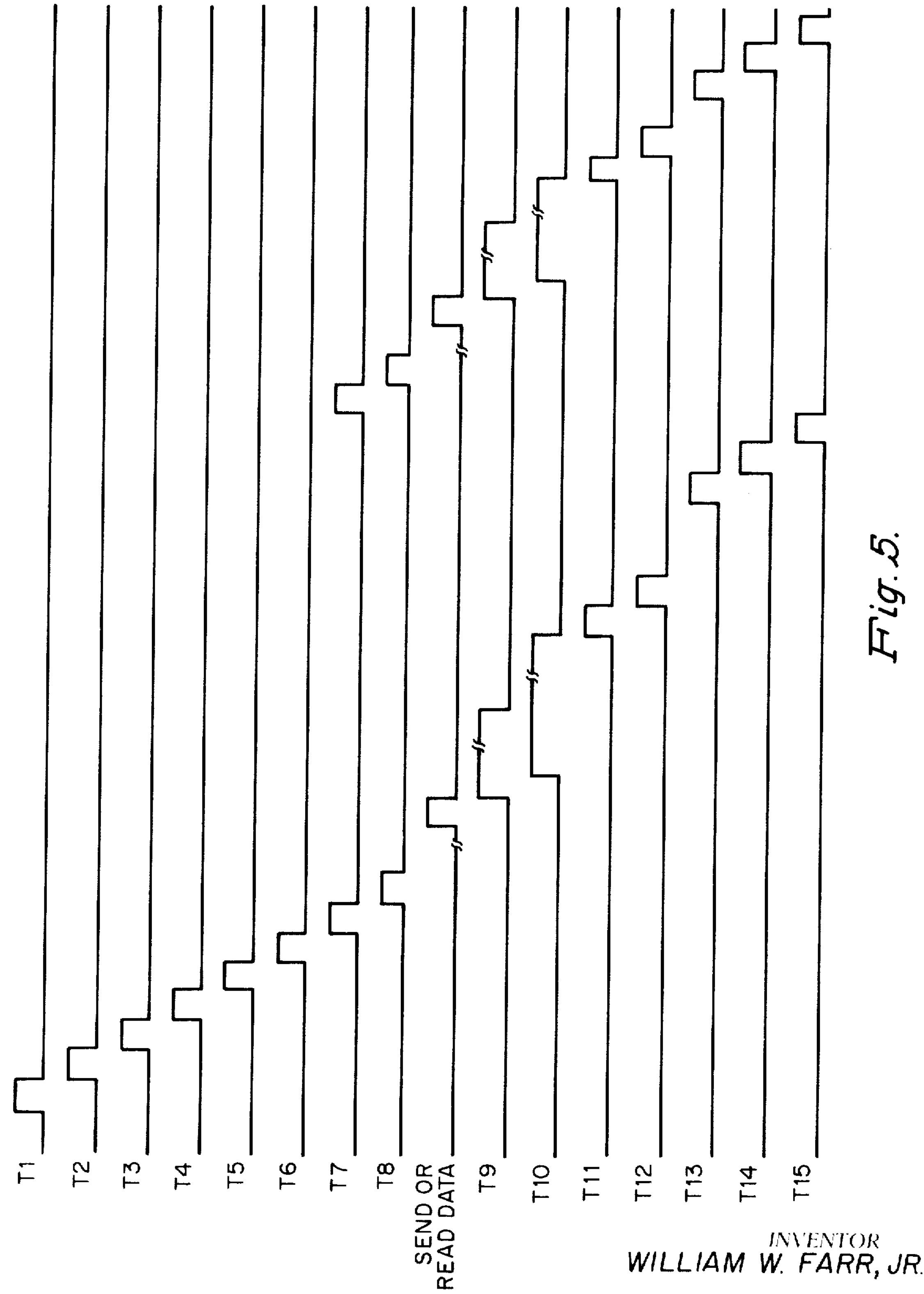
FIG. 5 is a timing diagram illustrating the timing utilized with the control circuitry of FIG. 4.
Figure 6:
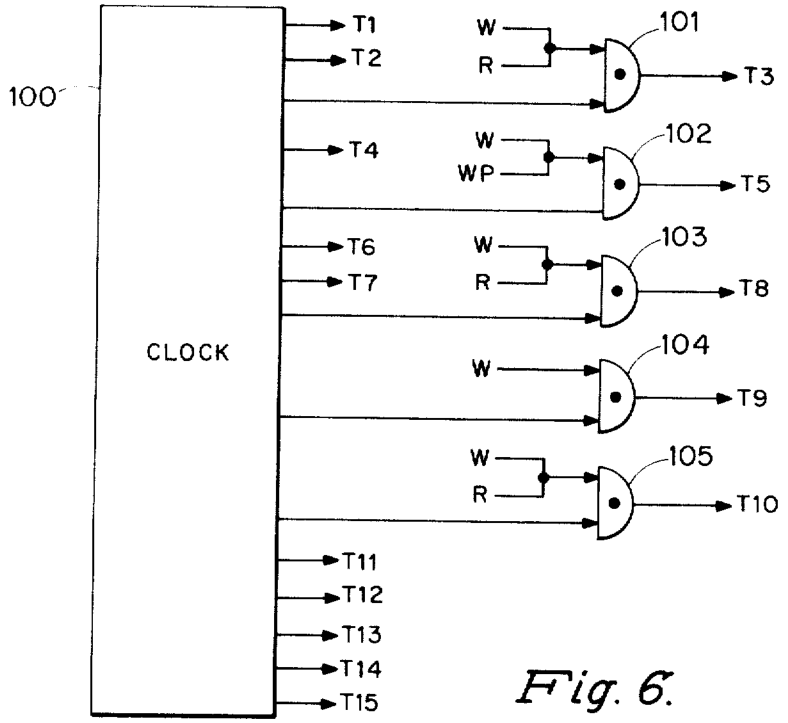
FIG. 6 is a block diagram illustrating the clock and gates for generating the timing signals shown in FIG. 5.

Before discussing the operation of the apparatus shown in FIG. 4, reference is made to the timing diagram of FIG. 5 in combination with the clock apparatus of FIG. 6. Clock 100 shown in FIG. 6 generates the timing pulses T1 through T15. Each of the timing pulses are of finite length whereas the timing pulses T9 and T10 may be several pulses each of finite length or one long pulse dependent on the size of buffer 42 in FIG. 4 and the size of the data field in a page. Certain of these pulses are generated from clock 100 whereas other ones of the timing pulses namely T3, T5 and T8 through T10 are generated only in response to the reception of write (W), read (R), or write pointer (WP) signals via gates 101 through 105 respectively. The clock 100 may be of standard design whose specific design is not critical to the apparatus of the present invention. The timing will be explained with regard to the specific operation of the apparatus shown in FIG. 4.

As discussed hereinbefore, the page buffer 21 in the memory 22 includes a plurality of addresses of its record starting with the last page address and ending with the first page address of the record. Generation of the page buffer 21 will be discussed hereinafter but for purposes of present discussion it will be assumed to exist in memory 22. Data to be stored in respective pages is included in data buffer 23 of memory 22. Each of the pages of data may be received either from data source 26 or from device 28 and will also be assumed for present discussion to exist in data buffer 23 of memory 22.

Generally for a write operation the operation of the apparatus shown in FIG. 4 is as follows. Initially the address of page buffer 21 in memory 22 is supplied to counter 30, the page of data buffer 23 in memory 22 is supplied to counter 32 and the initial address of the data buffer 23 is supplied to counter 34. The controller apparatus of FIG. 4 then accesses the first three page buffer 21 entries, namely the last page address, the first page address and the second page address and stores them in registers 36, 40 and 38 respectively. Register 40 then addresses the device to select the proper page number. When the page number of the device and the present pointer stored in register 40 agree, the controller becomes synchronous with the device and begins to write data in that page addressed via buffer 42, gates 48 and 50 and buffer 44. The reverse and forward pointers from registers 36 and 38 respectively are then written onto device 28 via gates 52 and 54 respectively as well as gate 50 and buffer 44. The contents of register 40 are then transferred into register 36 in order to update the reverse pointer. The forward pointer in register 38 is then transferred to register 40 to update the present pointer. A new forward pointer (the third page) is then obtained from page buffer 21 and stored in register 38. The present pointer then addresses device 28 and the process repeats until the data range in counter 32 runs out as detected by detector 56. This condition then commands processor 20 to stop the write operation.

In more detail, the operation of the controller apparatus of FIG. 4 in combination with the timing diagram of FIG. 5 follows. Once a write command is received by processor 20, the timing of clock 100 starts a write cycle. The page buffer address, data range and data buffer address are typically supplied by a program operating in processor 20 and at time T1 supplies the page buffer address to counter 30 via gate 58. At time T2 the data range is supplied to counter 32 via gate 60 and in addition at time T3 the data buffer address is supplied to counter 34 via gate 32. With such information stored in counters 30, 32 and 34, at the initial edge of timing pulse T4 the address in counter 30 is provided to the memory address input of processor 20 via gate 64. The trailing edge of pulse T4 increments counter 30 to the next page address. At time T5 in response to the address received from counter 30, the last page address in page buffer 21 (the first entry in the page buffer 21) is loaded into register 36 via gate 66 and at the same time the new address in counter 30 is received by processor 20 so that at time T6 the first page address in page buffer 21 (the second entry in the page buffer) is loaded into present pointer register 40 via gate 68. The page buffer address counter 30 then increments on the trailing edge of pulse T6 and the incremented address from counter 30 addresses processor 20 so that the second page address in page buffer 21 is loaded into register 38 at time T7 via gate 70. Counter 30 is again incremented during the trailing edge of pulse T7. Also at time T7 counter 32 is decremented via gate 72. Thus each of the three pointers are stored in their respective registers and a data transfer is ready to begin after the device 28 is positioned to the selected page number as indicated by the present pointer register 40.

At time T8, gate 74 is enabled to allow data buffer address counter 34 to address processor 20 via its memory address input so that a data transfer can begin as soon as the device 28 is properly positioned. The present pointer information from register 40 is coupled to one input of comparator 76 whose other input is coupled to receive the present page number from device 28. Once the present page number and the present pointer in register 40 agree, comparator 76, during the write operation, enables gate 78 and a send data pulse is generated and received by processor 20. After the send data signal is received or after a set period of time after the generation of pulse T8, pulse T9 is received at gate 80 so that buffer 42 may receive data stored in data buffer 23 of memory 22. Depending upon the particular requirement of the system a single character or word of each page may be loaded into buffer 42 or buffer 42 may be a double buffer which receives alternately characters or words of the pages in the data buffer 23. Another alternative is to allow buffer 42 to be of sufficient length to accept a full page of data from data buffer 23. Note that timing pulses T9 and T10 overlap for the case where buffer 42 is the length of a character. In any case, at time T10 and when the data field signal is produced as hereinafter discussed, gate 48 is enabled so that the data is then sent to gate 50 also enabled by a slightly delayed pulse T10 and the write signal. Data is then fed in parallel to buffer 44 preferably a character at a time and shifted out in serial by means of the shift input to buffer 44 so that the data is received in serial at the write input of device 28. At such time, the data is recorded on the device surface. The data field signal and complement thereto as well as the reverse pointer (RP) and the forward (FP) signals are generated by means of the data strobe output of device 28. As the device 28 rotates, data strobe pulses are generated for each bit position, triggering counter 82 previously enabled by a compare from comparator 76. The output of counter 82 is coupled to detector 84 which is wired to generate the various signals dependent on the count received from strobe counter 82.

With the data field now written into the first page of the record operated upon, the reverse and forward pointers must then be written. At time T11 and with the signal RP present, gate 52 is enabled to pass the reverse pointer information in register 36, which information is serialized via buffer 44 and received by the write input of device 28. Similarly at time T12 and with the signal FP present, gate 54 is enabled to pass the forward pointer information from register 38 which information is serialized via buffer 44 and received by device 28 and recorded. At time T13 the present pointer information from register 40 is written into register 36 by the enabling of gate 86. Also at time T13 gate 90 is partially enabled but is not fully enabled unless detector 56 detects an end of range condition. At time T14 the forward pointer information in register 38 is loaded into present pointer reigster 40 via gate 88. At time T15 the data buffer address counter 34 is incremented so that the proper page in data buffer 23 will be addressed when required and the gate 64 is enabled thereby allowing the third page address of page buffer 21 to be addressed via the memory address input of processor 20.

At the termination of time pulse T15, the cycle then repeats beginning at time T17. The period required for timing pulses T1 through T6 is either wasted or the recycle is started at time T7 via an adaptive technique as may be desired for a paritcular system. Thus at time T7 the third page address stored in page buffer 21 is loaded into forward pointer register 38 via gate 70. The process then repeats until timing pulse T15 is again received after which recycling occurs or until time T13 at which time the detector 56 may fully enable gate 90 thereby stopping the processor 20 from further execution.

Generally, the operation of the control apparatus shown in FIG. 4 for a read operation is as follows. Initially the page buffer address counter 30, the data range counter 32 and the data buffer counter 34 are loaded with their respective information via processor 20. Such information may be supplied under program control. For the read operation the page buffer 21 in memory 22 may include simply the address of the first page of the record which is to be read. Thus the address of the page buffer stored in counter 30 will address the first page address of the record to be read. The first page address is then loaded into the present pointer register 40 and the corresponding page of device 28 is selected thereby. After the information in the present pointer register 40 and present page number of device 28 agree, the control apparatus in FIG. 4 then begins to read the page addressed. The data is coupled at the read output of the device 28 via a serial to parallel buffer 46, the temporary storage buffer 42 and finally into processor 20 and memory 22. Following this data transfer the reverse and forward pointers are read from the device 28 into registers 36 and 38 respectively. The pointers need not be transferred to memory 22 unless the page buffer 21 is to be reconstructed. The forward pointer is then transferred to present pointer register 40 to become the present page number to be addressed. The process continues until the data range runs out.

More specifically, the read operation of the control apparatus of FIG. 4 in combination with the timing diagram of FIG. 5 is as follows. At times T1, T2 and T3 the page buffer address, data range and data buffer address are transferred to counters 30, 32 and 34 respectively as in the case of the write operation. At time T4 counter 30 addresses processor 20 after which counter 30 is incremented. After this at time T6 the first page address of the record stored in page buffer 21, which buffer now stores a single address for the complete record, is loaded into present pointer register 40 via gate 68. Note that pulse T5 is not used and may be inhibited by gate 102 of FIG. 6. At time T7, counter 32 is decremented and at time T8 counter 34 addresses memory 22. The contents of present pointer register 40 are then coupled to one input of comparator 76 and compared with the present page number of device 28 until a compare is generated. When a compare is generated by comparator 76, gate 92 is enabled thereby sending a read data command to device 28 as well as resetting buffer 46. When the read data signal is received by device 28, device 28 begins to generate data strobe signals at the input of counter 82 which has also been enabled by the compare from comparator 76. When the data field signal is generated via detector 84, gate 94 is enabled thereby passing data from the read output of device 28 to the input of buffer 46, which data is shifted in via the data strobe signals on the shift input of buffer 46. Buffer 46 then outputs the data preferably a character at a time in parallel to an input of gate 96 which is further enabled by the read signal and a slightly delayed data field signal. The data is thus passed to the input of temporary storage buffer 42. At time T10 gate 48 is enabled by pulse T10 and also by a slightly delayed data field signal and thus the data from buffer 42 passes through gate 98 which is enabled by the read input. The data is then transferred to the data input of processor 20. This data is then transferred to the data buffer 23 in memory 22 as addressed by the data buffer address counter previously at time T8. When signal RP is generated by detector 84 the reverse pointer information is loaded into register 36 by the enabling of gate 110. Also when the signal FP is generated by detector 84 the forward pointer is loaded into register 38 by the enabling of the gate 112. In substantially the same time frame as the generation of signals RP and FP, the timing pulses T11 and T12 are also generated so that the reverse and forward pointers respectively may be transferred via gate 98 and processor 20 to reconstruct a new page buffer in memory 22 or be stored elsewhere in memory 22, if so desired. At time T13 detector 56 is checked to determine whether the data range has run out. Note that the data range counter 32 had previously been decremented at time T7. If the data range has not run out, at time T14 the contents of forward pointer register 38 are transferred to present pointer register 40. At time T15 the data buffer address counter is incremented so that the data from the next page may be stored in the next position of data buffer 23. With the present pointer now updated to the second page of the particular record, the process recycles starting with timing pulse T7 until the data range has run out.

Having described both the write and read capabilities of the control apparatus of the present invention, it will now be seen that such apparatus may write the pointer information without writing the data itself. It will later be seen how this technique may be used in editing the pages of a record. When the pointers are to be written the processor 20 under program control supplies the page buffer address to counter 30 and the data range to counter 32. For purposes of illustration, the page buffer 21 includes each of the addresses of the record starting with the last page address and ending with the first page address as shown in FIG. 4. Following the above transfer of information at times T1 and T2, at time T4 the address from counter 30 is sent to the memory address input of processor 20 after which counter 30 is incremented. Note that since there will be no data transfer the data buffer address counter 34 is not utilized for the write pointer operation. At times T5, T6 and T7 the reverse, present and forward pointers respectively are loaded into their respective registers. Present pointer register 40 then addresses the device 28 via comparator 76 and once there is a compare generated, then with the write signal present, gate 78 is enabled and a Send Data signal is transmitted to processor 20. At this time, device 28 begins to generate data strobes and when the RP signal is generated by the data strobe signal in combination with the counter 82 and the detector 84, and when timing pulse T11 is also present, the reverse pointer information from register 36 is enabled through gate 52 and gate 50 and serialized by a buffer 44 after which it is written onto the device 28. Similarly upon the generation of the FP signal and at time T12, gate 54 is enabled transferring the contents of register 38 to the device 28. At time T13, the detector 56 is checked for an end of range condition and in addition, at time T13, the contents of register 40 are loaded into the reverse pointer register 36 via gate 86. At time T14 the contents of forward pointer register 38 are loaded into present pointer register 40 via gate 38. At this point the sequence is recycled starting with timing pulse T7 until the data range runs out. Thus it has been seen that the device 28 has received in the selected page location the reverse and forward pointer information which is indicated by page buffer 21 in memory 22 and this has been done without transferring, altering or writing data which may have been present for the pages in the data buffer 23 or in the device 28.

As was the case for the write pointer operation, the pointers may also be read from device 28 without reading or transferring the data stored in device 28. The read pointer process is analogous to the write pointer process in that at times T1 and T2, counters 30 and 32 are loaded, and at time T4 processor 20 is addressed and counter 30 is incremented. When we are reading the pointers, the page buffer 21 in memory 22 need not include each address of each page in the record. Only one page address need be in the page buffer 21 in memory 22. For purposes of explanation, the address may be the first page address of the record. At time T6, the first page address is loaded into the present pointer register 40. At time T7 the data range counter 32 is decremented to keep track of the location in the record. During this time, the present pointer register 40 addresses device 28. After a compare is generated by comparator 76 indicating that the present pointer and the present page number agree, strobe counter 82 is enabled and gate 92 is also enabled sending a Read Data signal to device 28. The output of gate 92 also resets buffer 46. At this point data is read out of device 28 into buffer 46 as was the case for the read operation, however, the data is not used since gate 48 is not enabled because timing pulse T10 is not present due to gate 105 in FIG. 6. When the RP and FP signals are produced by detector 84, the reverse pointer information and forward pointer information respectively are written into registers 36 and 38 via gates 110 and 112 respectively. During timing pulses T11 and T12 and with slightly delayed RP and FP signals, gates 52 and 54 respectively are enabled thereby transferring the contents of registers 36 and 38 in sequence via gate 98 to the data input of processor 20. This information is loaded into that location addressed by page buffer address counter 30, and the process continues after the data range as indicated by detector 56 is checked at time T13 and after the forward pointer is transferred from register 38 to register 40 at time T14. The read pointer process recycles starting at time T7. Thus it can be seen that the page buffer may be reconstructed in memory 22 and that the data need not be transmitted from device 28 during the read pointer operation.

It will now be seen that the reverse and forward pointers may be utilized for editing the record. In order to edit a record with either of the organizations of the aforementioned prior art, the entire record must be read into primary memory, rearranged, lengthened or shortened and then rewritten onto the device onto an area large enough to hold the edited record. With the organization and control apparatus of the present invention, pages may be added or deleted from a record simply by altering the pointers recorded in the pages logically before and after the pages to be added or deleted. The pointers, it will be seen, may be modified without rewriting the entire page. Two specific examples will be considered. Firstly, that condition where a page is to be deleted, and secondly, that condition where a page is to be added to a record. As will be hereinafter more specifically discussed with reference to FIGS. 8 and 9, a page availability table is preferably constructed in memory 22 which table includes a bit position for each page available in device 28. The bit is a binary one or zero dependent on whether or not that page is utilized or not utilized respectively in any existing record. Now proceeding with the editing operation, when a page is to be deleted, that page is specified by the processor 20 under program control. More specifically with reference to FIG. 3 let us assume that the third page having a device address C-4 is to be deleted. In such a case, the second page rather than having its forward pointer point to the third page C-4 must point to the fourth page A-7. The reverse pointer on the fourth page A-7 must point back to the second page C-2.

Figure 7:
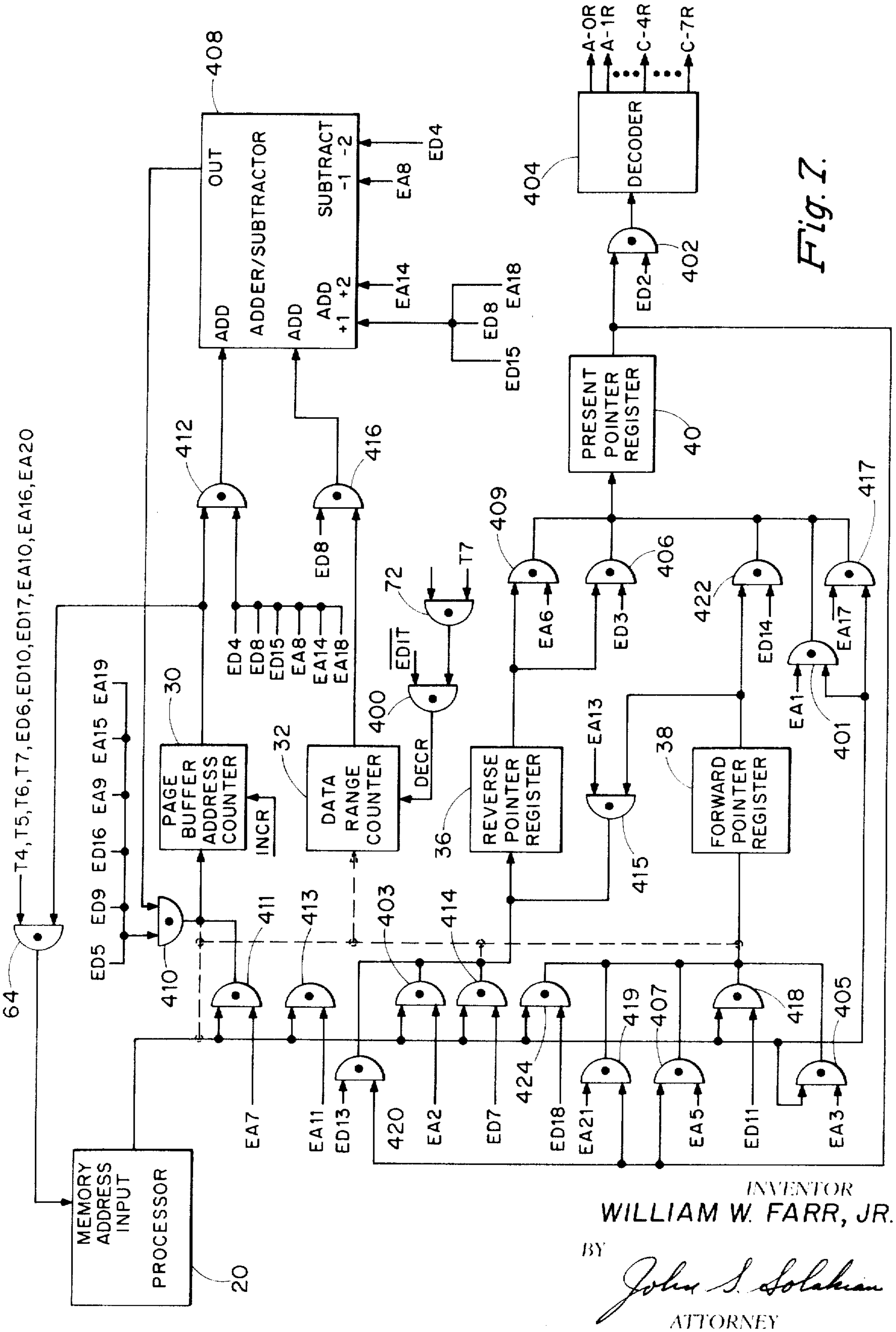
FIG. 7 illustrates in combination with the diagrms of FIG. 4, the editing control circuitry utilized in the present invention.

Now referring to FIG. 7 and FIG. 4, during an edit delete operation therefore processor 20 supplies the address of the first page to be deleted to counter 30 and also supplies the number of sequential pages to be deleted to counter 32. Registers 36, 40 and 38 are then loaded with the reverse, present and forward pointers respectively. After the page availability table is updated indicating that a page once utilized is now available for other records, a write edit forward pointer sequence is initiated. During this sequence, the page preceding the page deleted is loaded into the present register. The reverse pointer for that page is then loaded into the present pointer register and the page following the page or pages to be deleted is loaded into the forward pointer register. A modified write pointer operation is then performed. The modified write pointer operation utilizes that part of the write pointer operation starting with a compare via comparator 76 and the generation of the send data signal. The modified write pointer operation is completed after timing pulse T12. After the write edit forward pointer sequence, a write edit reverse pointer sequence is initiated so that the page following the page or pages to be deleted is edited so that its reverse pointer is pointing to the page before the page or pages to be deleted and its forward pointer is pointing to the page following it. The sequence is then performed utilizing a modified write pointer operation beginning with the generation of the send data signal and ending with timing pulse T12.

More specifically the edit operation on the page or pages to be deleted is as follows. Firstly, a sequence of pulses termed ED1 through ED19 is generated by a conventional clock which may be included in processor 20. Each step as indicated by the pulses is of equal length except ED1 and those pulses used when a modified write operation is performed. Each pulse ED (edit delete) is generated in sequence with the first such pulse ED1 generating a sequence of pulses hereinbefore referred to as T1 through T7. At time T1 processor 20 loads the address of the first page to be deleted into counter 30. At time T2 processor 20 supplies the number of sequential pages to be deleted to counter 32. At this point it should be observed that data range counter <u>32 is</u> inhibited from decrementing by <u>means</u> of the $\overline{\text{EDIT}}$ signal at the input of gate 400. The $\overline{\text{EDIT}}$ signal is also used to selectively inhibit those gates shown in FIG. 4 not utilized during an edit operation. Counter 34 is not used during the edit operation and accordingly at time T4 processor 20 is addressed by means of gate 64 by the contents of counter 30 after which counter 30 is incremented. At times T5, T6 and T7 the reverse, present and forward pointer registers are loaded with their respective pointers which in the example are pages C-2, C-4 and A-7 respectively. The connections for this loading are specifically shown in FIG. 4 and are shown in FIG. 7 by the dotted line connections. With the present pointer register 40 loaded with the page C-4, the time ED2, gate 402 is enabled thereby enabling decoder 404 to receive the contents of register 40 and to generate a reset signal which in this case would be C-4R. The page availability table is then updated as will be described. A write edit forward pointer sequence is then performed.

During a write edit forward pointer sequence, at time ED3 the contents of reverse pointer register 36 are loaded into the present pointer register 40 by the enabling of gate 406. The reverse pointer register 36 must now be loaded with the reverse pointer of the page now in the present register. This is accomplished at time ED4 by decrementing counter 30 by two. Adder/subtractor 408 is used for this purpose. Adder/subtractor 408 includes add inputs received from counter 30, counter 32 as well as incremental adder and subtract inputs. Each of these inputs is added or subtracted together to produce an output which is then loaded back into counter 30 via gate 410. Accordingly, at time ED4 and since counter 30 was incremented previously at time T4 adder/subtractor 408 receives a subtract minus two input and receives the contents of counter 30 via gate 412. At time ED5, the output of adder/subtractor 408 is loaded back into counter 30. At time ED6 counter 30 addresses the memory via gate 64 and the memory address input of processor 20. At time ED7, the page address is loaded into reverse register 36 via gate 414. The forward pointer must then be loaded into the forward pointer register 38. The forward pointer must be the address of the page which was previously in the present pointer register plus the number in the data range counter. In this case the number in the data range counter 32 is one since only one page is to be deleted. Accordingly at time ED8 the contents of counter 32 are fed to one input of adder/subtractor 408 via gate 416. The contents of counter 30 are also coupled to another input of adder/subtractor 408 by means of gate 412 and the adder/subtractor 408 further receives a plus one add input. At time ED9 the output of adder/subtractor 408 is coupled via gate 410 into counter 30, after which time at time ED10 counter 30 addresses the memory via processor 20. At time ED11 the page address is stored in the forward pointer register 38 via gate 418.

At this time the reverse, present, and forward pointer registers respectively have stored therein pages numbered A-1, C-2 and A-7, respectively. With these registers loaded as just stated, a modified write pointer operation is performed. Accordingly the second page of the record C-2 has had its forward pointer modified to point to the fourth page A-7.

Finally the fourth page A-7 must be edited so that its reverse pointer points to the second page C-2. To accomplish this an edit reverse pointer sequence is performed. At time ED13 the contents of the present pointer register 40 are loaded into the reverse pointer register 36 via gate 420 after which at time ED14, the present pointer register 40 is loaded with the contents of the forward point register 38 by means of gate 422. After the reverse and present pointer registers have been loaded, the forward pointer register must now be loaded with the forward pointer of the page now stored in the present pointer register. Thus at time ED15, the contents of counter 30 are incremented by one via adder/subtractor 408 after which time at time ED16 the output of adder/subtractor 408 is stored in counter 30. At time ED17 counter 30 addresses memory via processor 20, after which at time ED18, the page address is stored in forward pointer register 38 via gate 424. The contents of the reverse, present and forward pointer registers respectfully are thus pages C-2, A-7 and B-7. After these registers are loaded, at time ED19 a modified write pointer operation is performed. Thus a page has been deleted from the record and the forward pointer of the previous page thereto and the reverse pointer of the succeeding page thereto has been modified to reflect the deletion of such page.

Having described the deletion of a page in the record the following describes the operation for adding a page to the record. For this example, a single page A-0 will be added between the second page of the record (page C-2) and the third page of the record (page C-4). Generally the processor 20 under program control may supply the page number to be added to the record including its location in the record, such location being indicated by the previous page number and the next page number to the page to be added. At this time a modified write operation is performed, such modified write operation occurring between the initiation of the Send Data signal and time T12. Thus the added page with its pointers and data are written onto device 28. After this the forward pointer of the previous page to the added page must be modified and the reverse pointer of the following page must be modified to reflect the added page.

More specifically the operation of the apparatus when a page is to be added is as follows. Timing pulses EA1 through EA22 are utilized for this operation. As was the case for the write edit delete operation, each of these EA pulses (Edit Add) is sequential and equal in time duration except when a modified write operation or a modified write pointer operation is performed. The page number to be added with its position relative to the other pages is supplied by means of processor 20 starting at time EA1 when the present pointer register 40 is loaded with the page number to be added. At time EA2 reverse pointer register 36 is loaded with the page proceeding the page to be added and at time EA3 the forward pointer register 38 is loaded with the page number following the page to be added. Thus the reverse, present and forward pointer registers respectively have stored therein pages C-2, A-0, and C-4. A modified write operation is then performed at time EA4. After the new page A-0 has had its pointers and data written onto device 28 by the modified write operation, the forward and reverse pointers of the preceding and succeeding pages respectively must be modified.

By way of example the forward pointer of the preceding page C-2 is edited first. At time EA5 the contents of the present pointer register 40 are loaded into the forward pointer register 38 via gate 407. At time EA6, the contents of the reverse pointer register 36 are loaded into the present pointer register 40 via gate 409. At time EA7 counter 30 is loaded into the present pointer register 40 via gate 409. At time EA7 counter 30 is loaded with the address in page buffer 21 of the page C-2 which is that page preceding the page A-0 inserted. This is accomplished via gate 411. At time EA8 adder/subtractor 408 receives a minus one subtract input as well as the contents of counter 30 via gate 412. When timing pulse EA9 is generated, the output of adder/subtractor 408 is loaded into counter 30 via gate 410. At time EA10 the memory is addressed via processor 20 and at time EA11 the page address is loaded into reverse pointer register 36 via gate 413. At this point in time the reverse, present and forward pointer registers have stored therein the pages A-1, C-2 and A-0. After this at time EA12 a modified write pointer operation is performed. Thus the page preceding the page inserted has had its forward pointer updated to refer to the page inserted.

After such forward pointer has been updated, the reverse pointer of the page following the newly added page must be updated. Thus at time EA13 the contents of the forward pointer register 38 are loaded into the reverse pointer register 36 via gate 415. At time EA14 adder/subtractor 408 receives a plus two add input along with the contents of counter 30 thereby incrementing counter 30 by contents of counter 30 plus two when timing pulse EA15 is generated enabling gate 410 and enabling counter 30 to receive the output of adder/subtractor 408. The contents of counter 30 then address the memory at time EA16 after which at time EA17 the page addressed is loaded into the present pointer register 40 via gate 417. At time EA18 the contents of counter 30 are incremented by one by means of adder/subtractor 408 and the enabling of gate 410 at time EA19. The memory is then addressed at time EA20 after which the page addressed is outputed into forward pointer register 38 at time EA21 via gate 419. At this point in time the reverse, present and forward pointer registers have respectively pages A-0, C-4 and A-7 stored therein. At time EA22 a modified write pointer operation is performed so that the reverse pointer of the page succeeding the newly added page is updated.

The deletion of a page in a record has been shown for the general and specific cases of deleting one or more pages. The addition of pages has been shown for the specific case of adding one page. More than one page may be added to a record by taking advantage of the data range counter 32 in a manner similar to that used for the deletion for the general case of a deletion of a page or pages. It is also understood that the editing of the appropriate forward and reverse pointers as well as the newly added page or deleted pages may take any sequence, that is, the particular sequence in which the pointers are updated is not to be construed as a limitation of the principles of the present invention. It should also be noted that though the editing has been performed by means of apparatus, that such operation including the generation of the timing pulses, etc., may have been performed under program control.

Figure 8:
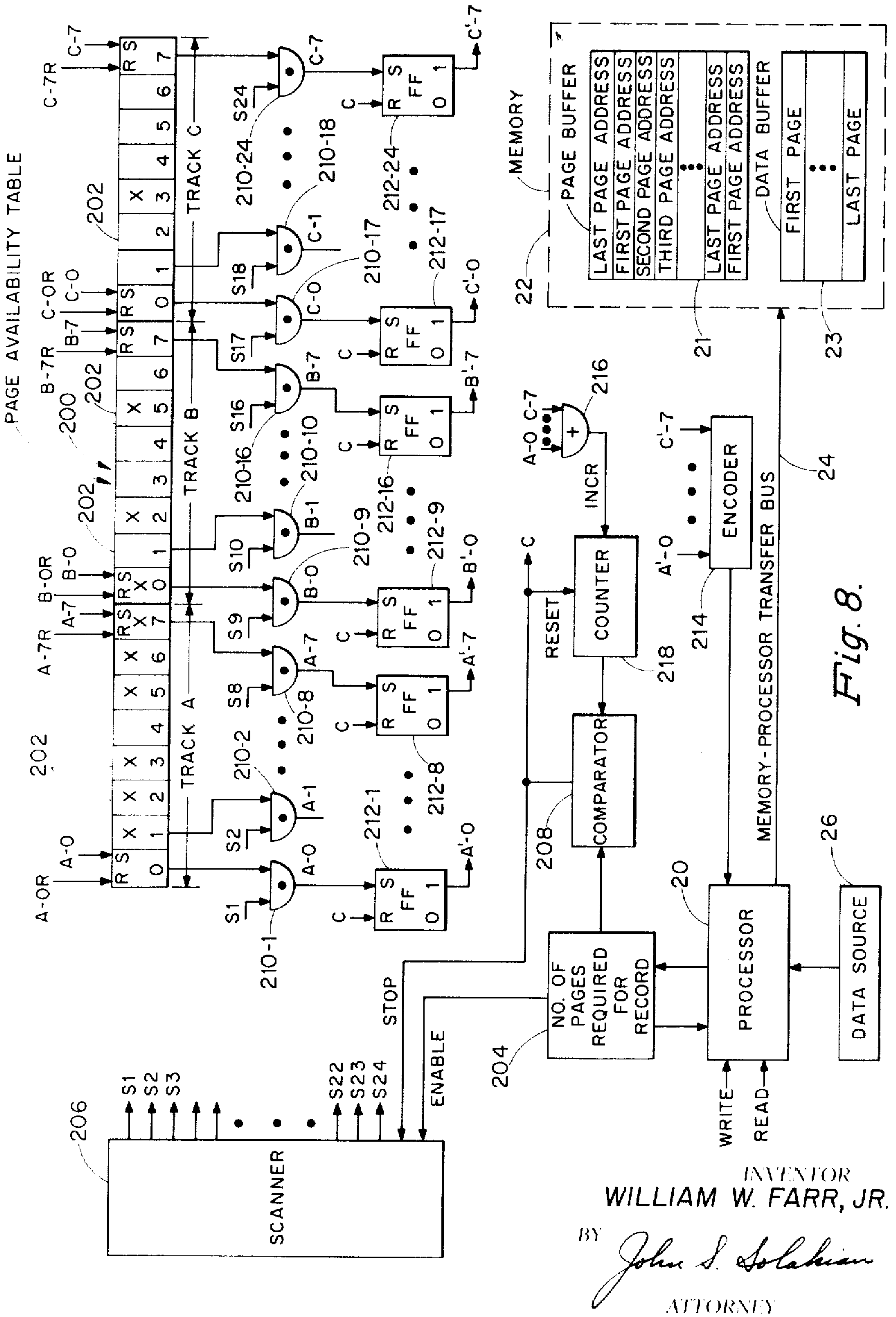
FIG. 8 illustrates a first embodiment for indicating the pages on the device available for use.

Now having described the editing capability of the controller apparatus of the present invention, generation of the page buffer in combination with the page availability table as shown in FIG. 8 will be discussed. The object of the apparatus shown in FIG. 8 is to construct a page buffer 21 utilizing available spaces on the device 28 which available spaces or pages are indicated by the page availability table 200. Page availability table 200 includes a plurality of bistable devices such as flip-flops 202 equal in number to the number of pages on the device 28. The presence of a binary 1 state in a flip-flop 202 indicates that the page indicated by that particular flip-flop is occupied with data. The absence of a binary 1, that is the presence of a binary 0 would indicate that the page indicated thereby is available for use. The page availability table is preferably constructed in primary memory so that each flip-flop is actually a magnetic core or semi-conductor storage device. As discussed, table 200 includes a bistable device for each sector of each track, that is, track A shown to the left of FIG. 8 is shown to include eight flip-flops numbered 0 through 7. Thus, with three tracks in the example shown and eight sectors, a total of 24 bistable devices are required to make up the page availability table 200.

Basically, the processor 20 receives data from data source 26 and will receive a write signal. The number of pages required for the data received from data source 26 may either be computed in processor 20 or by means of external circuit 204. Circuit 204 enables a scanner 206 and also indicates the number of pages required for a record to comparator 208. A scanner 206 is set to respond to the enable signal by outputting scanning pulses S1 through S24. A scanning pulse will enable a respective gate 210-1 through 210-24 if a scanning pulse is present and the other input to respective gate 210 receives a binary 0 input from its respective bistable device 202. The scanning pulses are shown to consecutively enable consecutive sectors, that is pages of track A, consecutive pages of track B, and then consecutive pages of track C. It can be seen however that the scanning pulses may enable gates 210 in other selected arrangements, for example, scanning pulses may be connected to enable the gates 210 associated with the first page of each track in consecutive arrangement, and then the gates 210 associated with the second page of each track in consecutive arrangement and so on until the last gate associated with the last page of a track are enabled in consecutive arrangement.

Each gate 210 is connected to set its respective flip-flops 212-1 through 212-24. Encoder 214 is coupled to the set outputs of the flip-flops 212 and sends the address associated with that flip-flop 212 to processor 20 which then transfers the information over memory process transfer buss 24 to memory 22 and subsequently page buffer 21. Note that the first through last page addresses will be loaded into page buffer 21 and that the first page address and the last page address are added to the end and beginning of the page buffer 21 by conventional techniques. Also shown in the apparatus of FIG. 8 is a circuit including OR gate 216 and counter 218 which counts the number of pages utilized for the particular record and then stops the scanner and operation of the circuit of FIG. 8 when the number of pages indicated in circuit 204 and number of pages counted by counter 218 agree.

In operation therefore, and assuming that each of the pages marked with an X in the page availability table are not available for use, when the scanner 206 is enabled, the first scanning pulse S1 is coupled to one input of gate 210-1. This enables gate 210-1 since bistable device 202 in position A-0 is not utilized, thereby setting flip-flop 212-1. The output of 210-1 may be utilized to set the bistable device 202 in position A-0 so that it may no longer be used. The set output of flip-flop 212-1 namely A′-0 is coupled to an input of encoder 214 which then through processor 20 writes the first page address into page buffer 21. The output of gate 210-1 is also coupled to OR gate 216 which increments counter 218 so that it now has an indication of one at its output. Since this output of counter 218 does not agree with the number of pages required for a record (five pages in exemplary record) as indicated in circuit 204 the scanner continues to operate. Scanning pulse S2 is then coupled to gate 210-2. However, since bistable device 202 associated with position A-1 is in use, gate 210-2 is not enabled and the scanner 206 outputs scanning pulse S3 and so on with the same result until scanning pulse S5 is sent from scanner 206. Since bistable device 202 associated with position A-4 is not utilized, gate 210-5 (not shown) and flip-flop 212-5 (not shown) are enabled and set respectively during which time the counter 218 is incremented and encoder 214 transmits the coded address for loading as the second page address in page buffer 21. This process continues until the pages indicated by the bistable devices 202 associated with positions B-1, B-3 and B-4 are selected for use and the address corresponding thereto are loaded into the page buffer 21. Since, at this point counter 218 has been incremented to indicate a five at its output which corresponds to the number of pages indicated in circuit 204, pulse C at the output of comparator 208 is generated resetting counter 218 and resetting the flip-flops 212. The five pages thus stored in page buffer 21 correspond to pages A-0, A-4, B-1, B-3 and B-4. The total revolution of device 28 to access these pages has been 1⅝ revolution. As mentioned hereinbefore the first and last page addresses are stored in their respective locations thereby completing the page buffer 21.

Figure 9:
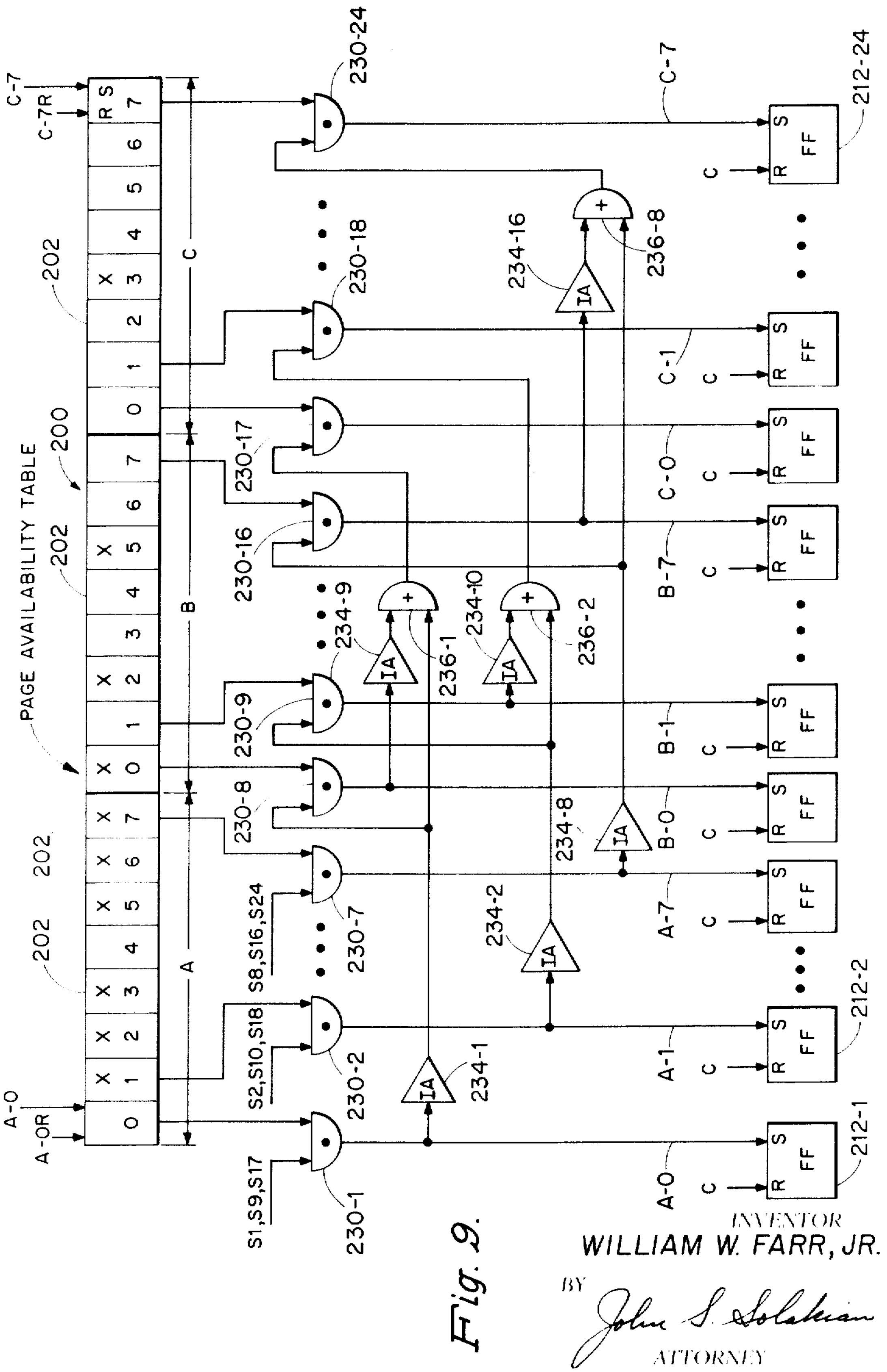
FIG. 9 illustrates a second embodiment indicating the pages on the device available for use.

The arrangement shown in FIG. 8 for determining the pages which will make up a record is quite simple. However, a total time or total revolutions required for device 28 may be minimized from the apparatus shown in FIG. 8. This optimum minimizing arrangement is shown in FIG. 9. The page availability table 200 is shown to include the bistable devices 202. The scanner 206 shown in FIG. 8 couples its outputs to gates 230-1 through 230-24. The object of the circuit of FIG. 9 is to allocate the pages in the record such that a minimum revolution time is required to both read and access the record which is to be stored on the device 28. Generally, the first sector for each track is interrogated for availability. If the first sector in the first track is available, then the first sector on the second and third tracks are not interrogated until a later time. Next the second sector on the first, second and third tracks in sequence are interrogated to determine availability. Again if the second sector of the first track is available, the second and third tracks are not interrogated until a later time. In this manner with a five page record the total revolution time of the device 28 for a given record is minimized.

The output of gate 230-1 is coupled to one input of gate 230-8 via inverter 234-1 and the output of gate 230-8 is coupled to one input of gate 230-17 via inverter 234-9 and OR gate 236-1. The outputs of gates 230 designated A-0 through C-7 are also coupled to the set input of their respective bistable device 202 in table 200. The gates 230 associated with the first sector of each track are coupled in sequential arrangement. In this manner if a gate such as gate 230-1 is enabled, then its bistable device 202 will be set. However, because of inverter 234-1 the next gate 230-8 will not be enabled and subsequently the gate 230-17 will not be enabled. The inverters 234-1 through 234-16 are provided between the outputs and inputs of various gates 230 and 236 in order to provide logic compatibility. The outputs of gates 230 are also connected to flip-flops 212-1 through 212-24 as was the case in the connection of gates 210 in FIG. 8. Thus, only the gates 230 shown in FIG. 9 and the connections thereto are different from the apparatus shown in FIG. 8.

In operation therefore, in assuming that the pages marked with an X in the page availability table 200 have been utilized, the process is as follows.

When scanning pulse S1 is received at gate 230-1, that gate is enabled since its respective bistable device 202 has not been utilized. This signal sets flip-flop 212-1 and also sets its bistable device 202. Gate 230-8 is not enabled because of the inversion generated by inverter 234-1. Gate 230-17 is not enabled because of the inversion generated in this case by inverter 234-1 or by inverter 234-9 through OR gate 236-1 as the case may be.

The next scanning pulse S2 is received at gate 230-2, however, that gate is not enabled because the associated bistable device 202 has been utilized. Accordingly, the output of inverting amplifier 234-2 partially enables gate 230-9 and since the associated bistable device 202 of page B1 has not been utilized gate 230-9 is fully enabled thereby setting its associated flip-flop 212 and setting its associated bistable device 202. Because of the inversion supplied by inverter 234-10 through OR gate 236-2, gate 230-18 is disabled. This process continues for scanning pulse S3 associated with the third sector of pages A-2, B-2, and C-2. Since pages A-2 and B-2 have been utilized and page C-2 has not been utilized, the next page to be used for the record being written is page C-2. Thus, the first three pages of the record are A-0, B-1 and C-2. In a like manner scanning pulse S4 will select page B-3 for utilization. The fifth and final page of the record will be selected in response to the scanning pulse S5. Since page A-4 has not been utilized scanning pulse S5 will select that page. Thus, it can be ssen that with the apparatus shown in FIG. 9, the total revolution of the device 20 is five-eighths of a revolution, whereas the total revolutions required with the apparatus of FIG. 8 was 1⅝ revolutions.

Figure 10:
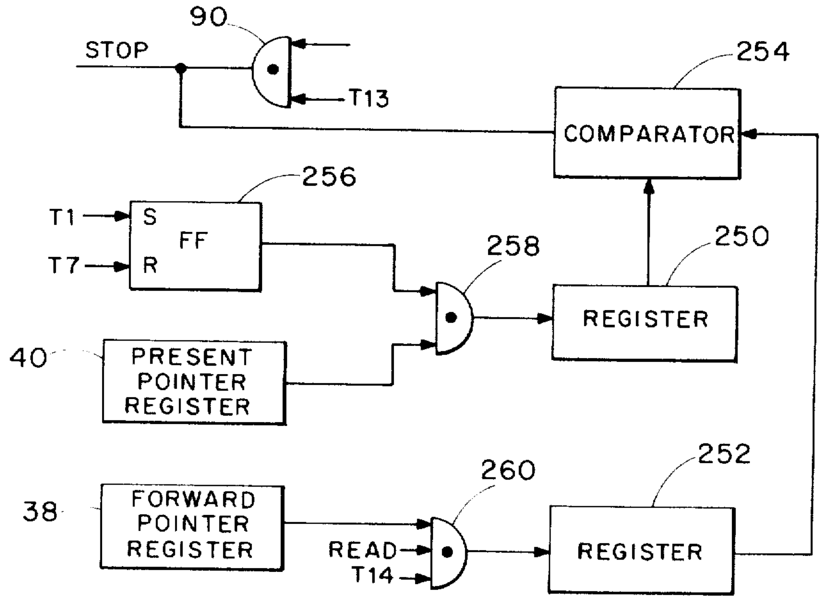
FIG. 10 illustrates end of record detection circuitry which may be utilized with circuitry of FIG. 4.

The apparatus of FIG. 4 illustrated the data range counter 32 which kept track of the pages required for example during the read process. It is presumed that if a record was to be read from the device 28, the processor 20 was required to provide a starting page address plus a data range. As is usually the case the range is supplied only when a part of a record is to be read from device 28. When the entire record is to be read from device 28 the data range need not be specified. FIG. 10 illustrates in block diagram form a circuit which does not require use of the data range counter 32, nor the data range information. Basically, when the contents of the present pointer register 40 as indicated in register 250 agrees with the contents of the forward pointer register 38 as indicated in register 252, a stop signal will be generated by a comparator 254. Flip-flop 256 is set between times T1 through T7 enabling gate 258 during that time so that the contents of present point register 40 are loaded into register 250. At time T14 during the read operation the contents of forward pointer register 38 are loaded into register 252 via the gate 260. Registers 250 and 252 are coupled to respective inputs of comparator 254 and when their contents agree a stop signal is generated. As seen before the output of gate 90 responsive to detector 56 and timing pulse T13 also generates a stop pulse.

It has thus been seen that the control apparatus of a device having an improved information organization has reduced the quantity of information which must be currently stored in primary storage. It has also been seen that the speed in which information is transferred between the processor and the device both in the reading and writing operations has been increased and that a faster and simplified editing of a record has been shown. Means have also shown for selecting the pages of a record to be written in order to minimize access time of the record.

Having now described the invention, what is claimed as new and novel and for which it is desired to secure Letters Patent is:

1. A rotational storage device comprising:

A. a plurality of circumferential tracks, each of said tracks including a plurality of segments;

B. means for providing a record, said record including a plurality of pages; and C. means for storing said pages in selected ones of said segments, each of said pages including data, a reverse pointer and a forward pointer; said means for storing said pages comprising:

1. means for enabling said reverse pointer to point to the previous page in said record,
2. means for enabling said forward pointer to point to the next page in said record, 3. means for enabling said reverse pointer of the first page in said record to point to the last page of said record, and
4. means for enabling said forward pointer of the last page in said record to point to the first page of said record.

2. A device as defined in claim 1, further comprising:

A. means for indicating the pages utilized in said device; and
B. means for selecting certain ones of the pages not utilized in said device to store said record.

3. A device as defined in claim 2, further comprising means for causing said means for indicating to indicate that said certain ones of the pages utilized to store said record are utilized.

4. A device as defined in claim 2 wherein said means for indicating includes a plurality of bistable devices substantially equal in number to the number of total pages on said device.

5. A device as defined in claim 4 wherein said means for selecting comprises:

A. means for generating scanning signals;
B. means responsive to said scanning signals for interrogating said bistable devices to determine the availability of said pages on said device; and
C. means for allocating the required amount of pages for said record which are indicated as available by said means for interrogating.

6. A device as defined in claim 5 wherein said means for interrogating interrogates said bistable devices in sequential order.

7. A device as defined in claim 5 wherein said means for interrogating first interrogates said bistable devices indicative of first identically numbered pages of said plurality of tracks, next interrogates said bistable devices indicative of second identically numbered pages of said plurality of tracks, and further similarly interrogates said bistable devices until the pages of said record have been allocated.

8. A device as defined in claim 7 wherein said means for interrogating comprises:

A. means for ceasing the interrogation of said identically numbered pages when one of said identically numbered pages is indicated to be available for use; and
B. means for initiating the interrogation of further identically numbered pages in response to said means for ceasing.

9. A device as defined in claim 5 further comprising:

A. means for indicating the number of pages required for said record;
B. means for terminating said means for allocating when the number of pages allocated equals the number in said means for indicating.

10. A device as claimed in claim 1 wherein said reverse pointer forward pointer and said data for each of said pages are arranged in sequence of rotation of said device starting with the data and followed by both of said pointers.

11. A device as defined in claim 1 wherein said reverse pointer, said forward pointer and said data for each of said pages are arranged in sequence of rotation of said device starting with both of said pointers and followed by said data.

12. A device as defined in claim 1 wherein said reverse pointer, said forward pointer and said data for each of said pages are arranged in sequence of rotation of said device starting with one of said pointers, followed by said data, and followed by the other of said pointers.

13. A device as defined in claim 1 further comprising:

A. primary storage means including
 1. page buffer means for storing the page addresses comprising said record, and
 2. data buffer means for storing the data for said pages comprising said record;
B. first means for writing said data stored in said data buffer means in the selected pages of said device; and
C. second means for writing said reverse pointer and said forward pointer in the selected pages of said device together with said data.

14. A device as defined in claim 13 wherein said first means for writing comprises buffer means connected to receive said data from said primary storage means, said buffer means preparing said data for writing on said device, and wherein said second means for writing comprises:

A. a first register for receiving the address of the page to be currently addressed;
B. a second register for receiving said reverse pointer;
C. a third register for receiving said forward pointer;
D. means for loading said first, second and third registers respectively with the current page to be addressed, the reverse pointer of said current page, and the forward pointer of said current page; and
E. means for writing on the page of said device indicated by said first register, the data for said indicated page, by means of said buffer means, and the pointers in each of said second and third registers.

15. A device as defined in claim 14 wherein

A. said buffer means converts a plurality of simultaneously received signals into a plurality of seqential signals; and wherein
B. said pointers from each of said second and third registers is written on said device by means of said buffer means.

16. A device as defined in claim 1 further comprising:

A. first register coupled to receive the address of the page of said device to be addressed;
B. second register coupled to receive the reverse pointer of said page to be addressed;
C. third register coupled to receive the forward pointer of said page to be addressed;
D. means for loading each of said registers;
E. means for addressing said device with the page address in said first register; and
F. means for writing said reverse and forward pointers on said device at said page addressed.

17. A device as defined in claim 16 further comprising:

A. data processor means coupled for transfer of information with each of said registers; and
B. primary storage means coupled for transfer of information with said data processor means, said primary storage means including information in the form of a page buffer means, said page buffer means including the page addresses of said device comprising said record.

18. A device as defined in claim 16 further comprising:

A. means for generating a recycle signal after the page address in said first register has addressed said device,
B. means for transferring the page address in said first register to said second register in response to said recycle signal;
C. means for transferring said forward pointer in said third register into said first register after the page address in said first register has been transferred; and
D. means for transferring into said third register a forward pointer for the page address indicated by said reverse pointer in said first register.

19. A device as defined in claim 18 further comprising means for addressing said device with the page address in said first register after the previous page addressed has been operated upon.

20. A device as defined in claim 1 further comprising:

A. a first register for receiving the address of one of said pages of said record which is written on said device;
B. means for addressing said device with the page address stored in said first register;
C. a second register;
D. a third register;
E. means for loading the reverse pointer of said page addressed into said second register; and
F. means for loading the forward pointer of said page addressed into said third register.

21. A device as defined in claim 20 further comprising:

A. primary storage means; and
B. means for writing said pointers stored in said second and third registers in said primary storage means.

22. A device as defined in claim 21 further comprising:

A. means for loading said forward pointer stored in said third register into said first register; and wherein
B. said means for addressing said device with the page address indicated by said forward pointer in said first register.

23. A device as defined in claim 20 further comprising:

A. means for receiving data;
B. buffer means coupled to receive data from said device and coupled to transfer said data to said receiving means, said data received as a plurality of sequential signals and said data transferred in groups of parallel signals; and
C. means for transferring the data of said page addressed to said receiving means by means of said buffer means.

24. A device as defined in claim 23 wherein said reverse pointer and said forward pointer are loaded respectively into said second and third registers by means of said buffer means.

25. A device as defined in claim 1 further comprising:

A. means for addressing said record with one of said pointers of any page of said record; and
B. means for reading each of the pages of said record addressed.

26. A device as defined in claim 1 further comprising:

A. means for addressing said record by means of one of said pointers in said record; and
B. means for reading selected pages of said record addressed starting with the page corresponding to said one of said pointers.

27. A device as defined in claim 1 further comprising means for deleting a page which is stored in said record, said means for deleting comprising:

A. for changing the forward pointer means of the page preceding said page to be deleted to indicate the page address of the page following said page to be deleted; and
B. means for changing the reverse pointer of the page following said page to be deleted to indicate the page address of the page preceding said page to be deleted.

28. A device as defined in claim 27 further comprising means for indicating that said page deleted from said record by said means for deleting is available for use in another record.

29. A device as defined in claim 27 wherein said means for changing said forward pointer comprises:

A. first and second registers;
B. first means for loading asaid first register with the address of the page preceding said page to be deleted;
C. second means for loading said second register with the address of the page following said page to be deleted;
D. means for addresing said device with the address loaded in said first register; and
E. means for writing the address loaded in said second register into the forward pointer location of the page addressed by said means for addressing.

30. A device as defined in claim 27 wherein said means for changing said forward pointer comprises:

A. first, second and third registers;
B. first means for loading said reverse and forward pointers for said page to be deleted into said first and second registers respectively;
C. means for transferring said reverse pointer for said page to be deleted from said first register to said third register;
D. second means for loading said first register with the reverse pointer of the page indicated by the reverse pointer for said page to be deleted, said second means for loading operating only after said means for transferring has operated;
E. means for addressing said device with the contents, the reverse pointer for said page to be deleted, of said third register; and
F. means for writing on said page addressed by said addressing means, the forward pointer loaded in said second register by said first loading means and the reverse pointer loaded in said first register by said second loading means.

31. A device as defined in claim 27 wherein said means for changing said reverse pointer comprises:

A. first and second registers;

B. first means for loading said first register with the address of the page following said page to be deleted;

C. second means for loading said second register with the address of the page preceding said page to be deleted;

D. means for addressing said device with the address loaded in said first register; and E. means for writing the address loaded in said second register into the reverse pointer location of the page addressed by said means for addressing.

32. A device as defined in claim 1 further comprising a means for deleting a plurality of sequential pages which are stored in said record, said means for deleting comprising:

A. means for changing the forward pointer of the page preceding said plurality of pages to be deleted to indicate the page address of the page following said plurality of pages to be deleted; and B. means for changing the reverse pointer of the page following said plurality of pages to be deleted to indicate the page address of the page preceding said plurality of pages to be deleted.

33. A device as defined in claim 1 further comprising means for adding a page in said record, said means for adding comprising:

A. means for changing the forward pointer of the page preceding said page to be added to indicate the page address of said page to be added; and B. means for changing the reverse pointer of the page following said page to be added to indicate the page address of said page to be added.

34. A device as defined in claim 33 wherein said means for changing said forward pointer comprises:

A. first and second registers;

B. first means for loading said first register with the address of the page preceding said page to be added;

C. second means for loading said second register with the address of the page to be added;

D. means for addressing said device with the address loaded in said first register; and E. means for writing the address loaded in said second register into the forward pointer location of the page addressed by said means for addressing.

35. A device as defined in claim 33 wherein said means for changing said reverse pointer comprises:

A. first and second registers;

B. first means for loading said first register with the address of the page following said page to be added;

C. second means for loading said second register with the address of the page to be added;

D. means for addressing said device with the address loaded in said first register; and E. means for writing the address loaded in said second register into the reverse pointer location of the page addressed by said means for addressing.

36. A device as defined in claim 1 further comprising means for adding a plurality of sequential pages in said record, said means for adding comprising:

A. means for changing the forward pointer of the page preceding said plurality of pages to be added to indicate the page address of the first page of said plurality of pages to be added; and B. means for changing the reverse pointer of the page following said plurality of pages to be added to indicate the page address of the last page of said plurality of pages to be added.

* * * * *